(12) United States Patent
Kim (10) Patent No.: US 8,170,614 B2
(45) Date of Patent: May 1, 2012

(54) DUAL-SIM MOBILE TERMINAL AND OPERATION METHOD FOR THE SAME

(75) Inventor: Yu Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 12/239,777

(22) Filed: Sep. 27, 2008

(65) Prior Publication Data

US 2009/0088211 A1     Apr. 2, 2009

(30) Foreign Application Priority Data

Sep. 28, 2007   (KR) .................. 10-2007-0098113

(51) Int. Cl.
    *H04B 1/38*   (2006.01)
(52) U.S. Cl. .............. 455/558; 455/550.1; 455/425; 455/435.1
(58) Field of Classification Search ............ 455/425, 455/426.1, 435.1, 435.2, 550.1, 552.1, 558
    See application file for complete search history.

(56) References Cited

U.S. PATENT DOCUMENTS

| 6,178,335 | B1* | 1/2001 | Vu | 455/558 |
| 7,395,973 | B2* | 7/2008 | Ho | 235/492 |
| 2003/0153356 | A1* | 8/2003 | Liu | 455/558 |
| 2003/0200445 | A1* | 10/2003 | Park | 713/185 |
| 2004/0180657 | A1* | 9/2004 | Yaqub et al. | 455/435.1 |
| 2006/0234693 | A1* | 10/2006 | Isidore et al. | 455/422.1 |
| 2008/0064443 | A1* | 3/2008 | Shin et al. | 455/558 |

FOREIGN PATENT DOCUMENTS

| DE | 198 23 074 A1 | 11/1999 |
| EP | 1 098 543 A1 | 5/2001 |
| EP | 1 223 768 A1 | 7/2002 |
| EP | 1 718 087 A1 | 11/2006 |
| WO | WO 99/62282 A1 | 12/1999 |

OTHER PUBLICATIONS

European Search Report dated Jan. 26, 2009 in connection with European Patent Application No. EP 08 16 3875.
Communication pursuant to ARticle 94(3) EPC dated Jun. 7, 2011 in connection with European Patent Application No. EP 08 163 875.1.

* cited by examiner

*Primary Examiner* — Kamran Afshar
*Assistant Examiner* — Marisol Fahnert (57) ABSTRACT

A dual-SIM mobile terminal and operation method for the same are disclosed. The dual-SIM mobile terminal checks the number of installed SIM cards during booting, and activates and deactivates the SIM switching mode according to the identified SIM card information. The operation method includes: detecting whether a first SIM card and second SIM card are installed in a first card socket and second card socket; storing SIM identification information regarding the detected SIM card; and performing a boot procedure on the basis of the detected SIM card. In particular, the SIM switching menu is displayed in an activated or deactivated state according to the identified SIM card information. Hence, the user can readily identify the number of installed SIM cards and the availability of SIM card switching through display status of the SIM switching menu.

19 Claims, 5 Drawing Sheets

DUAL-SIM MOBILE TERMINAL AND OPERATION METHOD FOR THE SAME

CROSS-REFERENCE TO RELATED APPLICATION(S) AND CLAIM OF PRIORITY

This application claims priority to an application entitled "DUAL-SIM MOBILE TERMINAL AND OPERATION METHOD FOR THE SAME" filed in the Korean Intellectual Property Office on Sep. 28, 2007 and assigned Serial No. 2007-0098113, the contents of which are incorporated herein by reference.

TECHNICAL FIELD OF THE INVENTION

The present invention relates generally to a dual-SIM mobile terminal and, more particularly, to a dual-SIM mobile terminal and operation method for the same that adjust operation according to the number of installed SIM cards.

BACKGROUND OF THE INVENTION

A subscriber identity module (SIM) card is a card installed in a mobile terminal to identify the subscriber carrying the mobile terminal. The SIM card stores personal information for various services such as authentication, billing and security. SIM cards have been developed to enable subscribers to freely use mobile communication at any places with their phone numbers regardless of mobile communication techniques such as Wideband Code Division Multiple Access (WCDMA) and Global System for Mobile communications (GSM). In particular, a subscriber identity module for the third generation Universal Mobile Telecommunications System (UMTS) is known as universal subscribe identity module (USIM).

A SIM card can be fabricated as a smart card, and be inserted in a mobile terminal. During booting, the mobile terminal having an inserted SIM card performs an initialization procedure, including reading subscriber information stored in the SIM card for authentication. A mobile terminal can only use an authenticated SIM card.

Most mobile terminals have a single SIM card, dual-SIM mobile terminals employing two SIM cards have been introduced recently. A dual-SIM mobile terminal may have one or two SIM cards. A dual-SIM mobile terminal with two SIM cards can switch SIM cards according to a user selection. That is, the user of a dual-SIM mobile terminal with two SIM cards can use two phone numbers.

When only one SIM card is installed in a dual-SIM mobile terminal, the SIM switching mode can be still activated even though SIM card switching is not possible. During an attempt at SIM card switching, the dual-SIM mobile terminal detects that a target SIM card is not installed in the card socket, and requests the user to insert a target SIM card. For example, the dual-SIM mobile terminal displays a notice "Insert SIM card" on the display unit.

There can be reasons for a SIM card switching attempt when only one SIM card is installed. First, the dual-SIM mobile terminal does not have information on the number of currently installed SIM cards.

In addition, although two card sockets are scheduled to be checked in sequence during booting of the dual-SIM mobile terminal, when a SIM card is installed in the first-checked card socket, the booting procedure may be performed using only the installed SIM card and the remaining card socket is not checked for installation of another SIM card.

SUMMARY OF THE INVENTION

To address the above-discussed deficiencies of the prior art, it is a primary object of the present invention to provide a dual-SIM mobile terminal and operation method for the same that check the number of currently installed SIM cards during booting.

The present invention also provides a dual-SIM mobile terminal and operation method for the same that enable and disable a SIM switching mode according to the number of installed SIM cards.

In accordance with an exemplary embodiment of the present invention, there is provided a dual-SIM mobile terminal and operation method for the same that check the number of installed SIM cards during booting and activate and deactivate the SIM switching mode according to the identified SIM card information.

In accordance with another exemplary embodiment of the present invention, there is provided an operation method for a dual-SIM mobile terminal, including: detecting, upon turning on the dual-SIM mobile terminal, whether a first SIM card and second SIM card are installed in a first card socket and second card socket; storing SIM identification information regarding the detected SIM card; and performing a boot procedure on the basis of the detected SIM card.

In accordance with another exemplary embodiment of the present invention, there is provided a dual-SIM mobile terminal including: a first card socket accommodating a first SIM card; a second card socket accommodating a second SIM card; a SIM detector detecting, upon turning on the dual-SIM mobile terminal, whether the first SIM card and second SIM card are installed in the first card socket and second card socket; a memory unit storing SIM identification information regarding the detected SIM card; and a booting part performing a boot procedure on the basis of the detected SIM card.

In accordance with another exemplary embodiment of the present invention, there is provided an operation method for a dual-SIM mobile terminal, including: detecting, upon turning on the dual-SIM mobile terminal, the number of installed SIM cards; and displaying a SIM switching menu in an activated or deactivated state according to the detected number of installed SIM cards.

In displaying the SIM switching menu, when the number of installed SIM cards is one, the SIM switching menu is displayed in a deactivated state; when the number of installed SIM cards is two, the SIM switching menu is displayed in an activated state; and when the number of installed SIM cards is zero, a notice requesting SIM card insertion is displayed.

In a feature of the present invention, the dual-SIM mobile terminal checks the number of installed SIM cards during booting, and activates and deactivates menu items related to the SIM switching mode according to the identified SIM card information. Hence, the user can readily identify the number of installed SIM cards and the availability of SIM card switching through display status of the SIM switching menu. That is, when only one SIM card is installed, the SIM switching menu is deactivated to disable the SIM switching mode. When two SIM cards are installed, the SIM switching menu is activated to enable the SIM switching mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Figure 1:
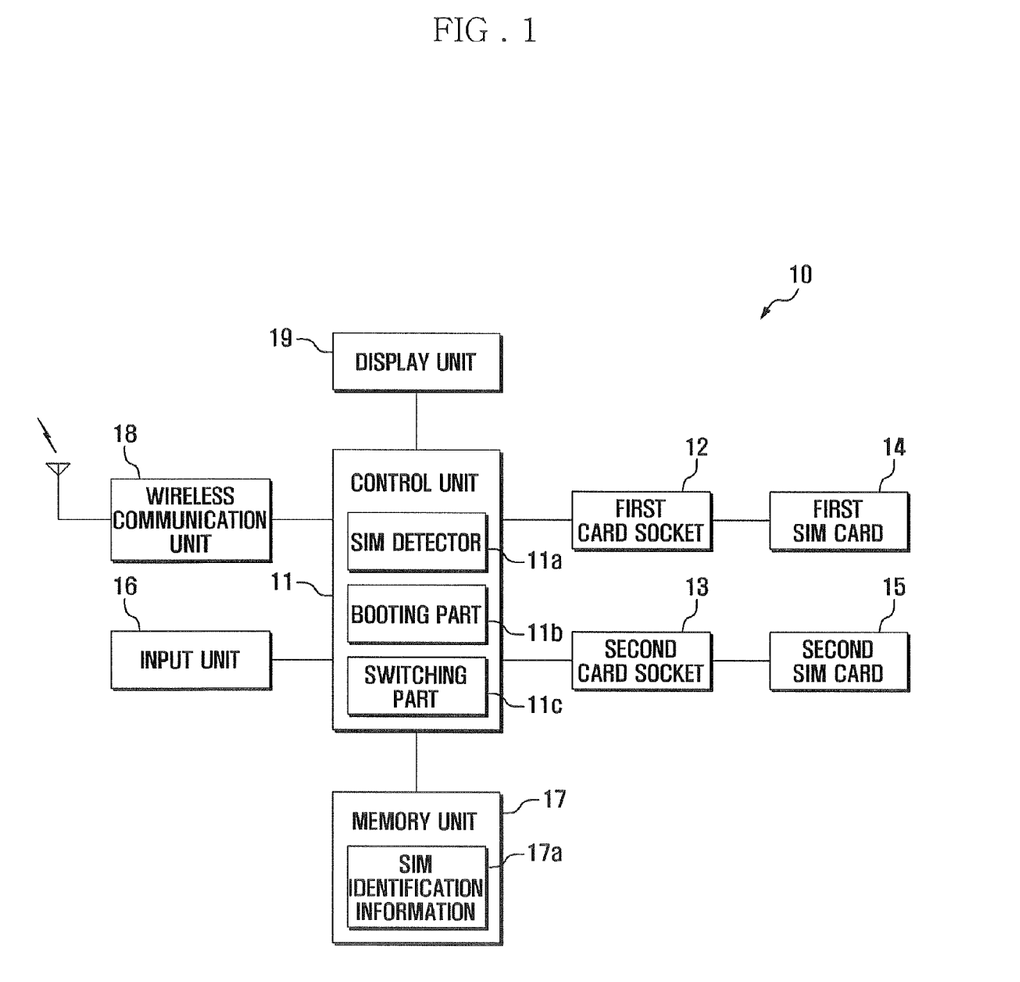
FIG. 1 is a block diagram illustrating a dual-SIM mobile terminal according to an exemplary embodiment of the present invention.

FIG. 1 is a block diagram illustrating a dual-SIM mobile terminal 10 according to an exemplary embodiment of the present invention.

Referring to FIG. 1, the dual-SIM mobile terminal 10 is a wireless communication terminal, and includes a first card socket 12 and second card socket 13 accommodating a first SIM card 14 and second SIM card 15, control unit 11, input unit 16, memory unit 17, wireless communication unit 18, and display unit 19.

The control unit 11 is a microprocessor controlling the overall operation of the dual-SIM mobile terminal 10. The control unit 11 checks installation of the first and second SIM cards 14 and 15 in the first and second card sockets 12 and 13, saves checking results as "SIM identification information", and determines whether to enable the SIM switching mode on the basis of the SIM identification information.

The first card socket 12 accommodates the first SIM card 14, and connects the first SIM card 14 and control unit 11 together.

The second card socket 13 accommodates the second SIM card 15, and connects the second SIM card 15 and control unit 11 together.

The input unit 16 includes a plurality of keys to manipulate the dual-SIM mobile terminal 10, and generates a selection signal corresponding to a key selection by the user and sends the selection signal to the control unit 11. The input unit 16 includes a power key for power on and off. User commands issued through the input unit 16 may include a booting command and SIM switching command. The input unit 16 may include input devices such as a keypad, touch pad, pointing device, and touch screen.

The memory unit 17 stores programs necessary for controlling the operation of the dual-SIM mobile terminal 10, and data generated from execution of the programs. The memory unit 17 includes one or more volatile and non volatile memory devices. The memory unit 17 stores a program that checks installation of the first and second SIM cards 14 and 15 in the first and second card sockets 12 and 13 and executes a boot procedure, stores SIM identification information 17a obtained through execution of the program, and stores another program that determines the availability of the SIM switching mode on the basis of the SIM identification information 17a stored in the memory unit 17 and performs SIM card switching according to a user selection signal.

The wireless communication unit 18 sends and receives a radio frequency (RF) signal to and from another mobile terminal. The wireless communication unit 18 converts a message signal from the control unit 11 into an RF signal through modulation and frequency conversion, and transmits the RF signal through an antenna. The wireless communication unit 18 extracts a message signal from an RF signal received by the antenna through frequency conversion and demodulation, and forwards the message signal to the control unit 11.

The display unit 19 displays a menu related to various functions of the dual-SIM mobile terminal 10, and various information stored in the memory unit 17. If first and second SIM cards 14 and 15 are not installed in the first and second card sockets 12 and 13 during booting, the display unit 19 displays a notice requesting installation of a first SIM card 14 or second SIM card 15. When only one SIM card is installed in the first card socket 12 or second card socket 13, the display unit 19 displays the SIM switching menu in a deactivated state. When first and second SIM cards 14 and 15 are installed in the first and second card sockets 12 and 13, the display unit 19 displays the SIM switching menu in an activated state.

When the SIM switching menu is displayed in a deactivated state, the SIM switching menu cannot be selected and the dual-SIM mobile terminal 10 does not transition to the SIM switching mode. When the SIM switching menu is displayed in an activated state, the user can select the SIM switching menu to switch to a SIM card to be used.

The control unit 11 includes a SIM detector 11a, booting part 11b, and switching part 11c.

The SIM detector 11a checks installation of the first and second SIM cards 14 and 15 in the first and second card sockets 12 and 13 during booting, and stores SIM identification information 17a regarding the SIM card installation in the memory unit 17. The booting part 11b performs a boot procedure using the installed SIM card. The switching part 11c performs SIM card switching according to a user selection when both the first and second SIM cards 14 and 15 are installed in the first and second card sockets 12 and 13. That is, when the SIM identification information 17a stored in the memory unit 17 includes both first SIM information and second SIM information (hereinafter, referred to as "dual SIM information"), the switching part 11c performs SIM card switching according to a user selection.

To check installation of the first and second SIM cards 14 and 15 in the first and second card sockets 12 and 13, the SIM detector 11a performs an activation procedure, in which it applies an identification signal to the first and second card sockets 12 and 13 and checks for output of a response signal therefrom. At this time, the SIM detector 11a determines whether the first or second SIM card 14 or 15 is installed by the presence of a response signal. An identification signal includes a clock signal, input-output signal and reset signal, which are fed in sequence to the first and second card sockets 12 and 13 with an applied voltage. A response signal is an answer-to-reset (ATR) signal output by the first SIM card 14 or second SIM card 15 through the first and second card sockets 12 and 13. The SIM detector 11a performs the activation procedure according to a preset sequence. In the description, the activation procedure is performed first on the first card socket 12; however, the present invention is not limited thereto.

In the following description, the activation procedure for the first card socket 12 is referred to as a first activation procedure, and the activation procedure for the second card socket 13 is referred to as a second activation procedure.

To check installation of the first and second SIM cards 14 and 15 in the first and second card sockets 12 and 13, the booting part 11b also performs an activation procedure, in which it applies an identification signal to the first and second card sockets 12 and 13 and checks for output of a response signal therefrom. The booting part 11b initializes the dual-SIM mobile terminal 10 using an identified SIM card.

When a single SIM card is detected by the SIM detector 11a, the booting part 11b performs a boot procedure using the detected SIM card. When two SIM cards are detected by the SIM detector 11a, the booting part 11b performs a boot procedure using a preset one of the two SIM cards. In the description, the booting part 11b performs booting through the first activation procedure based on the first SIM card 14.

The difference between the activation procedure performed by the SIM detector 11a and that performed by the booting part 11b is as follows. The SIM detector 11a performs both the first activation procedure and second activation procedure to check installation of the first and second SIM cards 14 and 15 in the first and second card sockets 12 and 13. When a SIM card is detected by one of the first activation procedure and second activation procedure, the booting part 11b performs initialization using the detected SIM card without performing the other activation procedure. For example, when the booting part 11b detects the first SIM card 14 during the first activation procedure, it does not perform the second activation procedure.

Although, in the above description, the booting part 11b performs the activation procedure to check installation of the first and second SIM cards 14 and 15 without using the stored SIM identification information 17a, it may also perform the boot procedure using the stored SIM identification information 17a. When the first SIM card 14 is not installed in the first card socket 12 and the second SIM card 15 is installed in the second card socket 13, the booting part 11b can directly perform the second activation procedure without performing the first activation procedure and initialize the dual-SIM mobile terminal 10 using the identified second SIM card 15.

When a main menu is selected after booting, the control unit 11 sets the SIM switching mode in an activated or deactivated state on the basis of the stored SIM identification information 17a. That is, if the SIM identification information 17a contains only one of the first SIM information and second SIM information, the control unit 11 displays the SIM switching menu in a deactivated state to prevent use of the SIM switching mode.

If the SIM identification information 17a contains dual SIM information, the control unit 11 displays the SIM switching menu in an activated state to permit use of the SIM switching mode. When the user inputs a key to select the SIM switching menu in an activated state, the switching part 11c performs SIM card switching from the current SIM card to the other SIM card. The switching part 11c controls switching between the first SIM card 14 and second SIM card 15 through a general-purpose input/output (GPIO) port.

As described above, the dual-SIM mobile terminal 10 displays the SIM switching menu in an activated or deactivated state according to the stored SIM identification information 17a. Hence, from the display status of the SIM switching menu, the user can readily identify the number of installed SIM cards and the availability of the SIM switching mode.

In the previous description, the SIM identification information 17a is indirectly displayed through the SIM switching menu. The user interface may also provide a separate menu through which the user can view the details of the SIM identification information 17a. In this case, upon selection of the menu, the control unit 11 can separately display an indicator of whether the first SIM card 14 and/or second SIM card 15 are installed in the first and second card sockets 12 and 13, information on the installed SIM card, and the currently used SIM card.

Next, an operation method for the dual-SIM mobile terminal 10 is described in detail with reference to FIGS. 1 to 5. The configuration of the dual-SIM mobile terminal 10 will be more apparent from the descriptions of the operation method.

Figure 2:
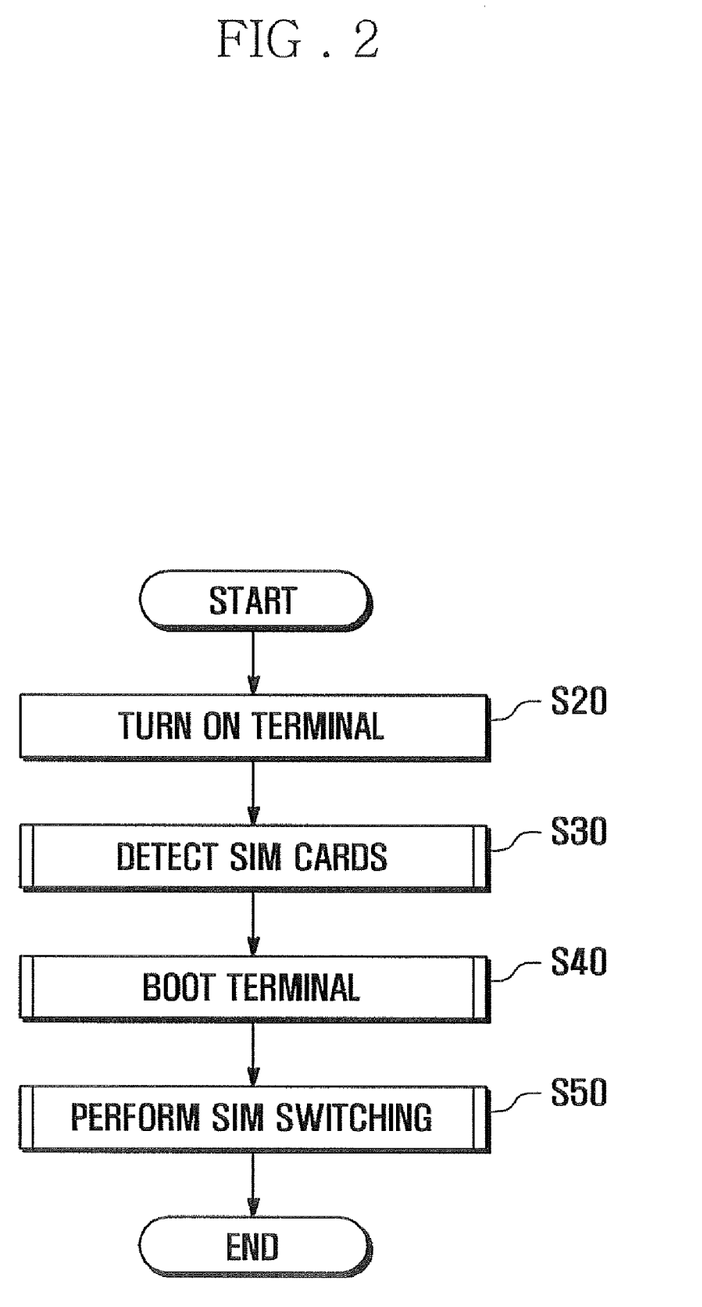
FIG. 2 is a flow chart illustrating an operation method for the dual-SIM mobile terminal according to another exemplary embodiment of the present invention.

Referring to FIGS. 1 and 2, the operation method of another exemplary embodiment of the present invention includes: turning on the terminal (S20), detecting SIM cards (S30), booting the terminal (S40), and performing SIM switching (S50). That is, upon pressing of the power key of the input unit 16 by the user when the dual-SIM mobile terminal 10 is turned off, power is applied to the elements of the dual-SIM mobile terminal 10 (S20). Whether a first SIM card 14 and second SIM card 15 are installed in the first and second card sockets 12 and 13 is checked, and SIM identification information 17a on the detected SIM card is stored in the memory unit 17 (S30). The dual-SIM mobile terminal 10 is booted using the detected SIM card (S40). If dual SIM information is contained in the SIM identification information 17a, SIM card switching is performed according to a user selection (S50).

Figure 3:
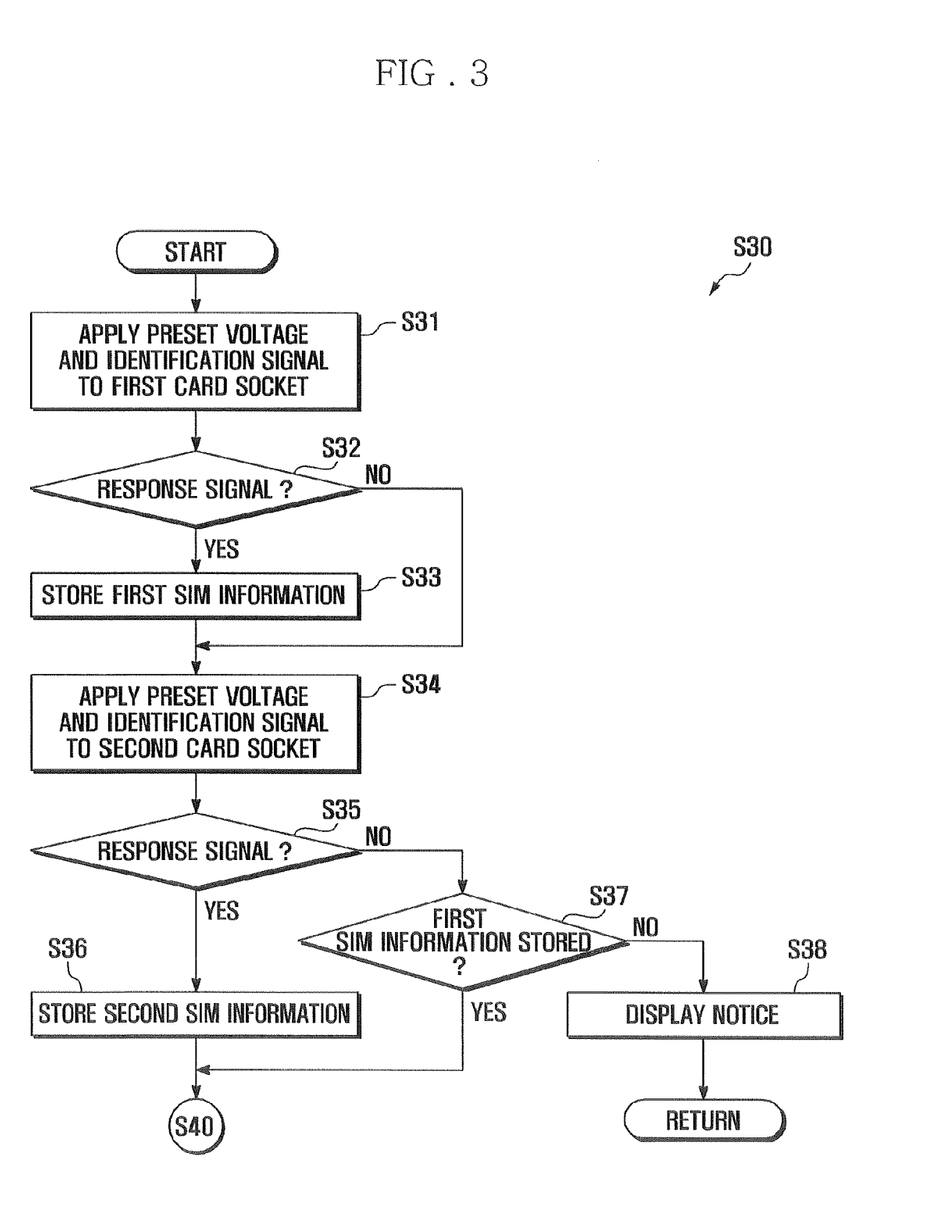
FIG. 3 is a flow chart illustrating a SIM card detection procedure in the method of FIG. 2.

FIG. 3 is a flow chart illustrating a SIM card detection procedure (S30) in the operation method.

Referring to FIGS. 1 and 3, the SIM detector 11a sequentially performs the first activation procedure (S31 and S32) and the second activation procedure (S34 and S35). That is, in the first activation procedure, the SIM detector 11a inputs an identification signal, including a clock signal, input-output signal and reset signal, to the first card socket 12 while a preset voltage is applied thereto (S31), and checks for output of a response signal associated with the identification signal through the first card socket 12 (S32). The presence of a response signal indicates installation of a first SIM card 14 in the first card socket 12.

If a response signal is present, the SIM detector 11a is aware of installation of the first SIM card 14 in the first card socket 12, and stores first SIM information in the memory unit 17.

To be more specific for steps S31 and S32, the first activation procedure includes a first unit procedure and second unit procedure performed in sequence. At the first unit procedure, the SIM detector 11a inputs an identification signal to the first card socket 12 while a 1.8V voltage is applied thereto and checks for output of a response signal through the first card socket 12. This first unit procedure is repeated up to three times until a response signal is detected.

When a response signal is not detected after the first unit procedure is repeated three times, the SIM detector 11a performs the second unit procedure in which it inputs an identification signal to the first card socket 12 while a 3V voltage is applied thereto and checks for output of a response signal through the first card socket 12. This second unit procedure is repeated up to three times until a response signal is detected.

When a response signal is detected during the first and second unit procedures, the SIM detector 11a stores first SIM information in the memory unit 17 (S33) and skips the remaining operations in the unit procedures.

When a response signal is not detected after both the first and second unit procedures are performed, the SIM detector 11a determines that a first SIM card 14 is not installed in the first card socket 12.

Thereafter, the SIM detector 11a performs the second activation procedure (S34 and S35). The second activation procedure is performed regardless of the result of the first activation procedure.

In the second activation procedure, the SIM detector 11a inputs an identification signal, including a clock signal, input-output signal and reset signal, to the second card socket 13 while a preset voltage is applied thereto (S34), and checks for output of a response signal associated with the identification signal through the second card socket 13 (S35).

When a response signal is detected during the second activation procedure, the SIM detector 11a determines that a second SIM card 15 is installed in the second card socket 13, stores second SIM information in the memory unit 17 (S36), and proceeds to step S40 for booting.

Like the first activation procedure, the second activation procedure includes a first unit procedure and second unit procedure performed in sequence on the second card socket 13, and detailed descriptions thereof are omitted.

When a response signal is not detected after the second activation procedure is completed, the SIM detector 11a checks whether first SIM information is stored in the memory unit 17 (S37).

If the first SIM information is stored in the memory unit 17, the SIM detector 11a proceeds to step S40 for booting. That is, if at least one SIM card is detected, step S40 is executed for booting.

If the first SIM information is not stored, the SIM detector 11a displays a notice requesting SIM card installation on the display unit 19 (S38). That is, because a response signal is not detected during the first and second activation procedures, the SIM detector 11a determines that no SIM card is installed in the first card socket 12 and second card socket 13, and displays a notice requesting SIM card installation on the display unit 19. The notice may be a string "Insert SIM". In this case, step S40 is not executed. The user must turn off the dual-SIM mobile terminal 10, install a first SIM card 14 or second SIM card 15, and turn on the dual-SIM mobile terminal 10, returning to step S20.

Figure 4:
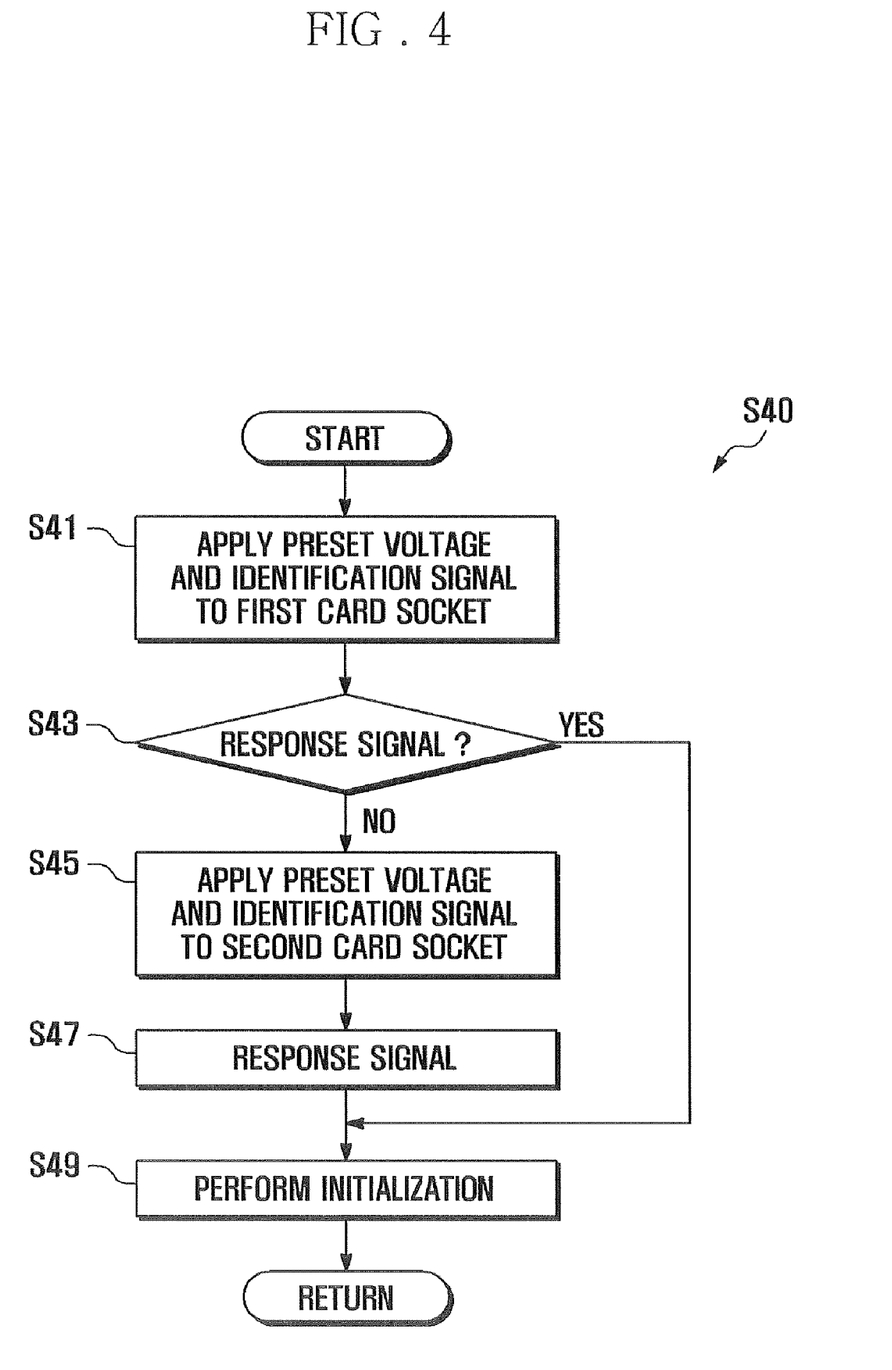
FIG. 4 is a flow chart illustrating a booting procedure in the method of FIG. 2.

FIG. 4 is a flow chart illustrating a booting procedure (S40) in the operation method.

Referring to FIGS. 1 and 4, the booting part 11b performs the first activation procedure (S41 and S43), which is the same as the first activation procedure performed by the SIM detector 11a. That is, the booting part 11b inputs an identification signal to the first card socket 12 while a preset voltage is applied thereto (S41), and checks for output of a response signal associated with the identification signal through the first card socket 12 (S43).

If a response signal is present, the booting part 11b initializes the dual-SIM mobile terminal 10 using the detected first SIM card 14 (S49).

If a response signal is not present, the booting part 11b performs the second activation procedure (S45 and S47), which is the same as the second activation procedure performed by the SIM detector 11a. That is, the booting part 11b inputs an identification signal to the second card socket 13 while a preset voltage is applied thereto (S45), and receives a response signal associated with the identification signal through the second card socket 13 (S47).

After reception of a response signal, the booting part 11b initializes the dual-SIM mobile terminal 10 using the detected second SIM card 15 (S49).

The booting procedure of step S40 is performed only when at least one SIM card is detected by the SIM detector 11a. Hence, the booting part 11b detects a response signal through one of the first activation procedure and second activation procedure, and performs step S40 for initialization. If a response signal is detected through the first activation procedure, the booting part 11b skips the second activation procedure.

Although, in the above description, the booting part 11b performs the first activation procedure or second activation procedure to check installation of the first and second SIM cards 14 and 15 without using the stored SIM identification information 17a, it may also perform the boot procedure using the stored SIM identification information 17a. That is, if the SIM identification information 17a contains only one of first SIM information and second SIM information, the booting part 11b initializes the dual-SIM mobile terminal 10 through the activation procedure using the detected SIM card. When the first SIM card 14 is not installed in the first card socket 12 and the second SIM card 15 is installed in the second card socket 13, the booting part 11b can directly perform the second activation procedure without performing the first activation procedure and initialize the dual-SIM mobile terminal 10 using the identified second SIM card 15.

Figure 5:
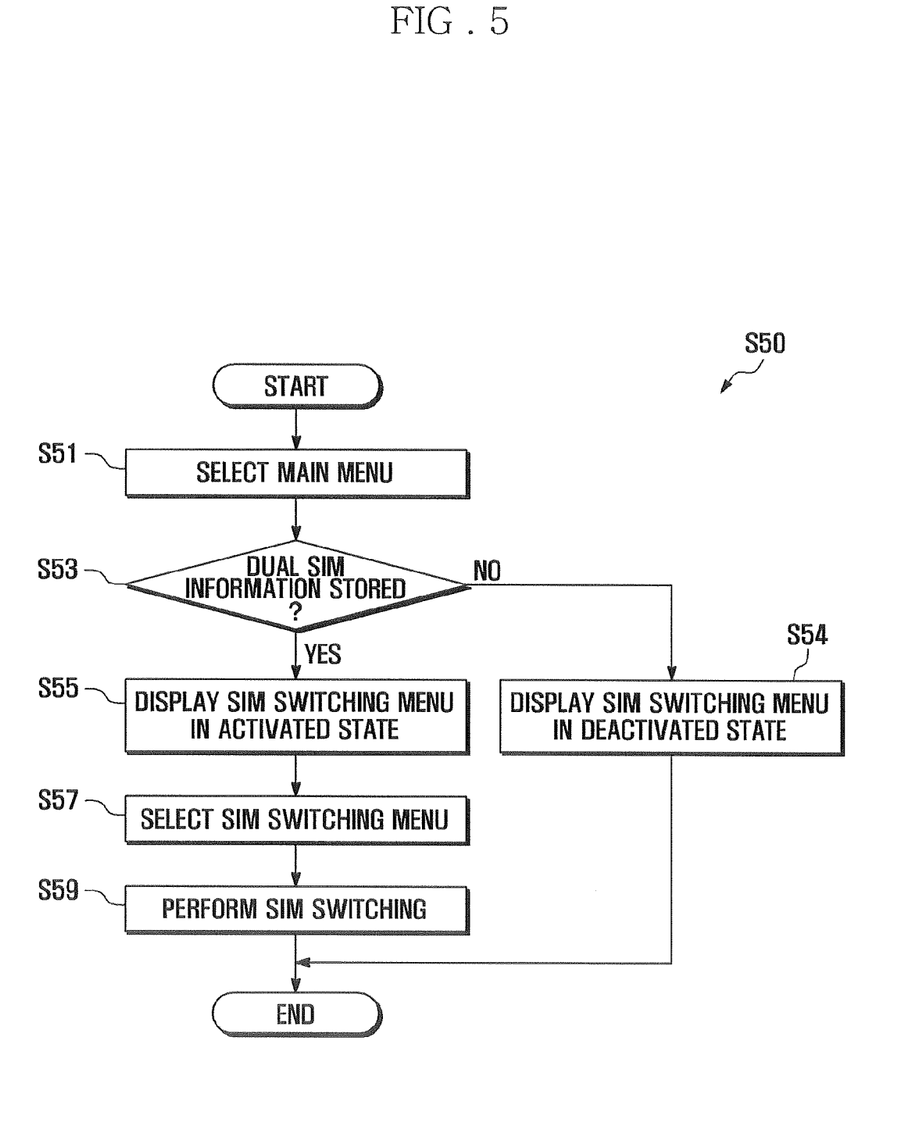
FIG. 5 is a flow chart illustrating a SIM card switching procedure in the method of FIG. 2.

FIG. 5 is a flow chart illustrating the SIM card switching procedure (S50) in the operation method.

Referring to FIGS. 1 and 5, when the user selects the main menu through a key input (S51), the control unit 11 displays menus linked to the main menu on the display unit 19. These menus can be displayed as texts or icons, and include the SIM switching menu.

The control unit 11 checks whether the dual SIM information is stored in the memory unit 17 (S53), and displays the SIM switching menu in an activated or deactivated state (S54 or S55). That is, if the SIM identification information 17a contains only one of the first SIM information and second SIM information, the control unit 11 displays the SIM switching menu in a deactivated state (S54).

If the SIM identification information 17a contains dual SIM information, the control unit 11 displays the SIM switching menu in an activated state (S55).

When the user selects the SIM switching menu in an activated state (S57), the switching part 11c performs SIM card switching (S59).

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An operation method for a dual-subscriber identity module (SIM) mobile terminal, comprising:

detecting, upon turning on the dual-SIM mobile terminal, whether a first SIM card and a second SIM card are installed in a first card socket and a second card socket;

storing a SIM identification information regarding the first SIM card if the first SIM card is installed in the first card socket;

storing SIM identification information regarding the second SIM card if the second SIM card is installed in the second card socket;

selecting and performing a boot procedure according to the number of installed SIM cards by:

performing the boot procedure based on the installed SIM card when a single SIM card is installed in a socket; and performing the boot procedure based on a preset SIM when both the first and second SIM cards are installed in the sockets, wherein performing a boot procedure comprises:

inputting an identification signal to the first card socket or the second card socket;

detecting one of the first SIM card and second SIM card outputting a response signal associated with the identification signal; and initializing the dual-SIM mobile terminal using the detected SIM card.

2. The operation method of claim 1, wherein detecting whether a first SIM card and a second SIM card are installed comprises: inputting an identification signal to the first card socket and the second card socket; and checking for an output of a response signal associated with the identification signal from the first card socket and the second card socket to determine an installation of the first SIM card and the second SIM card.

3. The operation method of claim 2, wherein the identification signal comprises a clock signal, an input-output signal and a reset signal that are applied in sequence while a preset voltage is applied to the first card socket or the second card socket, and wherein the response signal is an answer-to-reset (ATR) signal output through the first card socket or the second card socket.

4. The operation method of claim 3, wherein performing a boot procedure comprises: inputting an identification signal to the first card socket or the second card socket according to the SIM identification information; detecting one of the first SIM card and the second SIM card outputting a response signal associated with the identification signal; and initializing the dual-SIM mobile terminal using the detected SIM card.

5. The operation method of claim 1, wherein when one SIM card is detected in detecting whether a first SIM card and a second SIM card are installed, the boot procedure is performed using the detected SIM card.

6. The operation method of claim 5, further comprising displaying, upon selection of a main menu after booting, a SIM switching menu of the main menu in a deactivated state.

7. The operation method of claim 1, wherein when two SIM cards are detected in detecting whether a first SIM card and a second SIM card are installed, the boot procedure is performed using a preset one of the two SIM cards.

8. The operation method of claim 7, further comprising displaying, upon selection of a main menu after booting, a SIM switching menu of the main menu in an activated state.

9. The operation method of claim 8, further comprising performing, upon selection of the SIM switching menu in an activated state, a SIM card switching.

10. A dual-subscriber identity module (SIM) mobile terminal comprising:

a first card socket accommodating a first SIM card;

a second card socket accommodating a second SIM card;

a SIM detector detecting, upon turning on the dual-SIM mobile terminal, whether the first SIM card and the second SIM card are installed in the first card socket and second card socket;

a memory unit storing a SIM identification information regarding the first SIM card if the first SIM card is installed in the first card socket, and the second SIM card if the second SIM card is installed in the second card socket; and a booting part configured to select and perform a boot procedure according to the number of installed SIM cards by performing a boot procedure based on the installed SIM card when a single SIM card is installed in a socket, and performing a boot procedure based on a preset SIM card when both the first and second SIM cards are installed in the sockets, wherein, to perform the boot procedure, the booting part inputs an identification signal to the first card socket or the second card socket, detects one of the first SIM card and the second SIM card outputting a response signal associated with the identification signal, and initializes the dual-SIM mobile terminal using the detected SIM card.

11. The dual-SIM mobile terminal of claim 10, wherein the SIM detector inputs an identification signal to the first card socket and the second card socket, and checks for an output of a response signal associated with the identification signal through the first card socket and the second card socket to determine an installation of the first SIM card and the second SIM card.

12. The dual-SIM mobile terminal of claim 11, wherein the identification signal comprises a clock signal, an input-output signal and a reset signal that are applied in sequence while a preset voltage is applied to the first card socket or the second card socket, and wherein the response signal is an answer-to-reset (ATR) signal output through the first card socket or the second card socket.

13. The dual-SIM mobile terminal of claim 12, wherein the booting part inputs an identification signal to the first card socket or the second card socket according to the SIM identification information, detects one of the first SIM card and the second SIM card outputting a response signal associated with the identification signal, and initializes the dual-SIM mobile terminal using the detected SIM card.

14. The dual-SIM mobile terminal of claim 10, wherein the booting part performs, when one SIM card is detected by the SIM detector, the boot procedure using the detected SIM card.

15. The dual-SIM mobile terminal of claim 14, further comprising a display unit displaying, upon selection of a main menu after booting, a SIM switching menu of the main menu in a deactivated state.

16. The dual-SIM mobile terminal of claim 10, wherein the booting part performs, when two SIM cards are detected by the SIM detector, the boot procedure using a preset one of the two SIM cards.

17. The dual-SIM mobile terminal of claim 16, further comprising a display unit displaying, upon selection of a main menu after booting, a SIM switching menu of the main menu in an activated state.

18. The dual-SIM mobile terminal of claim 17, further comprising a switching part performing, upon selection of the SIM switching menu in an activated state, a SIM card switching.

19. An operation method for a dual-subscriber identity module (SIM) mobile terminal, comprising:
  detecting, upon turning on the dual-SIM mobile terminal, a number of installed SIM cards;
  displaying a SIM switching menu according to the detected number of installed SIM cards, comprising:
  displaying, when the number of installed SIM cards is one, the SIM switching menu in a deactivated state;
  displaying, when the number of installed SIM cards is two, the SIM switching menu in an activated state; and
  displaying, then the number of installed SIM cards is zero, a notice requesting SIM card insertion; and
  performing a boot procedure according to the number of installed SIM cards, comprising:
  inputting an identification signal to the first card socket or the second card socket;
  detecting one of the first SIM card and second SIM card outputting a response signal associated with the identification signal; and
  initializing the dual-SIM mobile terminal using the detected SIM card.

* * * * *